United States Patent
Velusamy

(10) Patent No.: US 11,792,733 B2
(45) Date of Patent: *Oct. 17, 2023

(54) BATTERY CHARGE AWARE COMMUNICATIONS

(71) Applicant: eBay Inc., San Jose, CA (US)

(72) Inventor: Lakshmanan Velusamy, Bellevue, WA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,657

(22) Filed: Sep. 17, 2021

(65) Prior Publication Data

US 2022/0007296 A1    Jan. 6, 2022

Related U.S. Application Data

(63) Continuation of application No. 16/736,040, filed on Jan. 7, 2020, now Pat. No. 11,160,026, which is a
(Continued)

(51) Int. Cl.
*H04W 52/02*    (2009.01)

(52) U.S. Cl.
CPC ... *H04W 52/0264* (2013.01); *H04W 52/0277* (2013.01); *Y02B 70/30* (2013.01); *Y02D 30/70* (2020.08)

(58) Field of Classification Search
CPC .......... H04W 52/0264; H04W 52/0277; Y02B 70/30; Y02D 30/70
See application file for complete search history.

(56) References Cited

U.S. PATENT DOCUMENTS

| 7,120,500 B1 | 10/2006 | Seligman |
| 7,407,108 B1 * | 8/2008 | Euler .................. G06F 1/32 |
| | | 455/574 |

(Continued)

FOREIGN PATENT DOCUMENTS

| EP | 1096762 A2 | 5/2001 |
| EP | 1096762 A3 | 3/2004 |

OTHER PUBLICATIONS

Non-Final Office Action received for U.S. Appl. No. 14/676,683, dated Nov. 18, 2016, 13 pages.
(Continued)

*Primary Examiner* — Ivan O Latorre
(74) *Attorney, Agent, or Firm* — FIG. 1 Patents

(57) ABSTRACT

A system and method for conducting battery charge aware communications is disclosed. A system receives a content request from a client device, wherein the content request indicates one or more content items. The system retrieves the one or more requested content items from a content database at the system. The system determines whether the content request includes current remaining battery power data for the client device. In response to determining that the content request includes the current remaining battery power data for the client device, the system determines whether a current remaining battery power is below a predetermined threshold. In response to determining that the current remaining battery power is below the predetermined threshold, the system analyzes the one or more requested content items to determine core content sections. The system transmits the determined core content sections to the client device.

20 Claims, 9 Drawing Sheets

Related U.S. Application Data continuation of application No. 15/845,800, filed on Dec. 18, 2017, now Pat. No. 10,568,036, which is a continuation of application No. 14/676,683, filed on Apr. 1, 2015, now Pat. No. 9,872,255.

(56) References Cited

U.S. PATENT DOCUMENTS

| | | |
|---|---|---|
| 8,676,149 B2 | 3/2014 | Beamish |
| 8,730,403 B2 | 5/2014 | Yang |
| 8,943,027 B1* | 1/2015 | Dwan .................. G06F 16/215 |
| | | 707/661 |
| 9,294,553 B1* | 3/2016 | Vaswani ................. H04L 67/14 |
| 9,628,830 B1* | 4/2017 | Ashbacher ......... H04N 21/2353 |
| 9,830,436 B1 | 11/2017 | Roche |
| 9,872,255 B2 | 1/2018 | Velusamy |
| 10,032,430 B2* | 7/2018 | Huang ..................... G09G 5/00 |
| 10,051,302 B2* | 8/2018 | Hasek ............. H04N 21/25858 |
| 10,277,669 B1* | 4/2019 | Joliveau ............... H04N 21/222 |
| 10,568,036 B2 | 2/2020 | Velusamy |
| 11,160,026 B2 | 10/2021 | Velusamy |
| 2003/0236892 A1* | 12/2003 | Coulombe ............ H04L 67/303 |
| | | 709/228 |
| 2004/0001635 A1* | 1/2004 | Van Der Schaar ........................ |
| | | H04N 21/25808 |
| | | 382/233 |
| 2004/0044781 A1* | 3/2004 | Hymel .................... H04W 4/20 |
| | | 709/229 |
| 2004/0210628 A1* | 10/2004 | Inkinen ................ H04L 67/535 |
| | | 709/201 |
| 2005/0156748 A1 | 7/2005 | Lee |
| 2007/0073672 A1 | 3/2007 | Mcveigh et al. |
| 2007/0078959 A1 | 4/2007 | Ye et al. |
| 2007/0188144 A1 | 8/2007 | Hara et al. |
| 2007/0266106 A1 | 11/2007 | Kato |
| 2008/0068627 A1 | 3/2008 | Tart et al. |
| 2008/0242369 A1 | 10/2008 | Kazuta et al. |
| 2008/0294674 A1 | 11/2008 | Reztlaff, II et al. |
| 2009/0044128 A1* | 2/2009 | Baumgarten ....... G06F 16/9577 |
| | | 715/738 |
| 2009/0232480 A1* | 9/2009 | Jendbro ............... H04N 19/132 |
| | | 386/224 |
| 2010/0049719 A1 | 2/2010 | Payne et al. |
| 2010/0328725 A1 | 12/2010 | Gaucas et al. |
| 2011/0072292 A1 | 3/2011 | Khawand et al. |
| 2011/0189980 A1 | 8/2011 | Proulx et al. |
| 2011/0268000 A1 | 11/2011 | Kashikar et al. |
| 2012/0068993 A1* | 3/2012 | Kambhatla ............... G06F 3/14 |
| | | 345/213 |
| 2012/0117484 A1 | 5/2012 | Convertino et al. |
| 2012/0210325 A1 | 8/2012 | De Lind et al. |
| 2013/0041590 A1 | 2/2013 | Burich et al. |
| 2013/0210493 A1 | 8/2013 | Tal et al. |
| 2013/0246325 A1* | 9/2013 | Averbuch ................. G06N 5/02 |
| | | 706/46 |
| 2013/0329777 A1* | 12/2013 | Konda ................. H04N 19/164 |
| | | 725/116 |
| 2014/0046943 A1 | 2/2014 | Scott et al. |
| 2014/0173036 A1 | 6/2014 | Das |
| 2014/0267439 A1* | 9/2014 | Jenkins ..................... H03L 5/00 |
| | | 345/668 |
| 2014/0354659 A1 | 12/2014 | Apodaca |
| 2015/0085057 A1* | 3/2015 | Ouyang ............. H04L 12/1827 |
| | | 348/14.02 |
| 2015/0143144 A1* | 5/2015 | Balbierer .......... H04L 12/40039 |
| | | 713/320 |
| 2015/0244833 A1* | 8/2015 | Grue .................. H04M 1/72445 |
| | | 709/219 |
| 2016/0021208 A1* | 1/2016 | Freiman ................ H04L 67/306 |
| | | 709/203 |
| 2016/0070782 A1 | 3/2016 | Kannan et al. |
| 2016/0150040 A1* | 5/2016 | Fan ......................... H04L 67/14 |
| | | 709/217 |
| 2016/0249296 A1 | 8/2016 | Grunewald et al. |
| 2016/0295517 A1 | 10/2016 | Velusamy |
| 2018/0110011 A1 | 4/2018 | Velusamy |
| 2018/0227606 A1* | 8/2018 | Fryer ................. H04N 21/2343 |
| 2020/0145926 A1 | 5/2020 | Velusamy |

OTHER PUBLICATIONS

Notice of Allowance received for U.S. Appl. No. 14/676,683, dated Jun. 30, 2017, 13 pages.
Notice of Allowance received for U.S. Appl. No. 14/676,683, dated Sep. 12, 2017, 8 pages.
Non-Final Office Action received for U.S. Appl. No. 15/845,800, dated May 15, 2019, 25 pages.
Notice of Allowance received for U.S. Appl. No. 15/845,800, dated Oct. 17, 2019, 8 pages.
Non Final Office Action received for U.S. Appl. No. 16/736,040, dated Mar. 25, 2021, 23 pages.
Non-Final Office Action received for U.S. Appl. No. 16/736,040, dated Oct. 14, 2020, 23 pages.
Notice of Allowance received for U.S. Appl. No. 16/736,040, dated Jul. 21, 2021, 11 pages.

* cited by examiner

| CLIENT ID 402 | NETWORK ADDRESS 404 | BATTERY POWER DATA 406 | REQUESTED CONTENT IDENTIFIER 408 | REQUEST TIMESTAMP 410 |
|---|---|---|---|---|

BATTERY CHARGE AWARE COMMUNICATIONS

PRIORITY

This application is a continuation of U.S. patent application Ser. No. 16/736,040, filed Jan. 7, 2020, which is a continuation of U.S. patent application Ser. No. 15/845,800, filed Dec. 18, 2017, which is a continuation of and claims the benefit of priority to U.S. patent application Ser. No. 14/676,683, filed Apr. 1, 2015, which is hereby incorporated by reference herein in its entirety.

TECHNICAL FIELD

Embodiments of the present disclosure relate generally to wireless communication and, more particularly, but not by way of limitation, to battery charge aware communications

BACKGROUND

The rise in electronic and digital device technology has rapidly changed the way society interacts with media and consumes goods and services. Digital technology enables a variety of consumer devices to be available that are very flexible and relatively cheap. Specifically, modern electronic devices, such as smart phones and tablets, allow a user to have access to a variety of useful applications even when away from a traditional computer. One useful application is the providing of location-based services using a position-locating module to determine when a user crosses a boundary or is near a place of interest.

However, as electronic devices are used for more purposes, battery power is increasingly important. As such, conserving battery power is a key challenge that is faced by all parties in the mobile electronic devices sector.

BRIEF DESCRIPTION OF THE DRAWINGS

Various ones of the appended drawings merely illustrate example embodiments of the present disclosure and cannot be considered as limiting its scope.

FIG. 4 depicts a block diagram of an exemplary data structure for a content item request, in accordance with some example embodiments.

Figure 1:
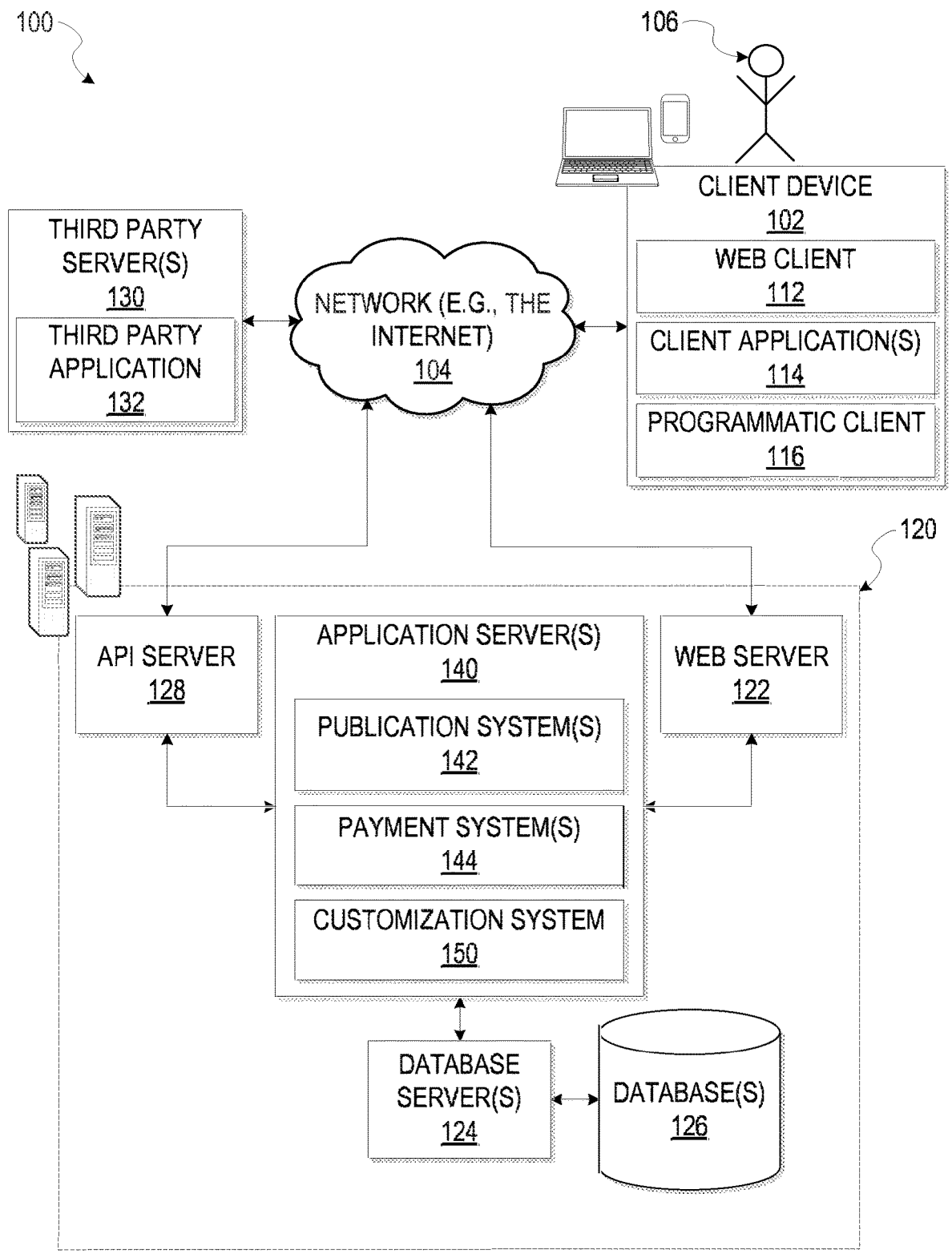
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As electronic devices shrink in size and grow in function, the effective battery life of each device has limits in attractiveness to consumers. As such, efforts to extend effective battery life have been key to developing new electronic devices. Hardware developers develop smaller and more efficient batteries, and software developers develop programs that efficiently use the existing hardware (and battery) more efficiently.

In some example embodiments, battery life can also be extended by optimizations at the server system. In some example embodiments, a server system receives a content item request from a client device. In some example embodiments, the content item request identifies one or more content items stored in a database associated with the server system.

In some example embodiments, the server system determines whether the content item request includes current remaining battery power data for the requesting client device. In accordance with a determination that the content item request does not include current remaining battery power data for the requesting client device, the server system transmits the requested content items to the client device.

In some example embodiments, in accordance with a determination that the content item request includes current remaining battery power data for the requesting client device, the server system determines whether the current remaining battery power data indicates a remaining battery power below a predetermined threshold value. For example, if the predetermined threshold value is 10%, the server system determines whether the remaining battery power is below 10% of the maximum battery power.

In some example embodiments, in accordance with a determination that the current remaining battery power data indicates current remaining battery power below the threshold value, the server system analyzes the requested content items to determine, for each requested content item (if there are more than one), one or more core content sections of the content item. A core content section is the portion or portions of the content that are the most central to the content. In some example embodiments, core content sections include a lower resolution or frame rate version of the content item. In some example embodiments, the creator of the content item designates which portions of the content item are the core content sections. In other example embodiments, the server system uses content analysis rules to automatically determine the core content sections of a given content item.

In some example embodiments, once the core content sections of a given content item are determined, the server system transmits them to the requesting client device. By sending only the core content sections, the server system reduces the amount of battery power needed to receive and present the requested content item.

With reference to FIG. 1, an example embodiment of a high-level client-server-based network architecture 100 is shown. A server system 120, in the example forms of a network-based marketplace or payment system, provides server-side functionality via a network 104 (e.g., the Internet or wide area network (WAN)) to one or more client device 102. FIG. 1 illustrates, for example, a web client 112 (e.g., a browser, such as the Internet Explorer® browser developed by Microsoft® Corporation of Redmond, Washington State), client application(s) 114, and a programmatic client 116 executing on client device 102.

The client device 102 may comprise, but is not limited to, a mobile phone, laptop, portable digital assistant (PDA), smart phone, tablet, ultra book, netbook, laptop, multi-processor system, microprocessor-based or programmable consumer electronics, game console, set-top box, or any other communication device that a user, such as user 106, may utilize to access the server system 120. In some embodiments, the client device 102 may comprise a display module (not shown) to display information (e.g., in the form of user interfaces). In further embodiments, the client device 102 may comprise one or more of a touch screen, accelerometer, gyroscope, camera, microphone, global positioning system (GPS) device, and so forth. The client device 102 may be a device of a user 106 that is used to perform a transaction involving digital items within the server system 120. In one embodiment, the server system 120 is a network-based marketplace that responds to requests for product listings, publishes publications comprising item listings of products available on the network-based marketplace, and manages payments for these marketplace transactions. One or more users 106 may be a person, a machine, or other means of interacting with the client device 102. In embodiments, the user 106 is not part of the network architecture 100, but may interact with the network architecture 100 via the client device 102 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 102 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 102, then this application is configured to locally provide the user interface and at least some of the functionalities with the application configured to communicate with the server system 120, on an as needed basis, for data and/or processing capabilities not locally available (e.g., access to a database of items available for sale, to authenticate a user, to verify a method of payment, etc.). Conversely if the e-commerce site application is not included in the client device 102, the client device 102 may use its web browser to access the e-commerce site (or a variant thereof) hosted on the server system 120.

One or more users 106 may be a person, a machine, or other means of interacting with the client device 102. In example embodiments, the user 106 is not part of the network architecture 100, but may interact with the network architecture 100 via the client device 102 or other means. For instance, the user 106 provides input (e.g., touch screen input or alphanumeric input) to the client device 102 and the input is communicated to the server system 120 via the network 104. In this instance, the server system 120, in response to receiving the input from the user 106, communicates information to the client device 102 via the network 104 to be presented to the user 106. In this way, the user 106 can interact with the server system 120 using the client device 102.

An application program interface (API) server 128 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database server 124 that facilitates access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the server system 120 via the programmatic interface provided by the API server 128. For example, the third party application 132, utilizing information retrieved from the server system 120, supports one or more features or functions on a website hosted by the third party. The third party website, for example, provides one or more promotional, marketplace, or payment functions that are supported by the relevant applications of the server system 120.

The publication system(s) 142 may provide a number of publication functions and services to users 106 that access the server system 120. The payment system(s) 144 may likewise provide a number of functions to perform or facilitate payments and transactions. While the publication system(s) 142 and payment system(s) 144 are shown in FIG. 1 to both form part of the server system 120, it will be appreciated that, in alternative embodiments, each system 142 and 144 may form part of a payment service that is separate and distinct from the server system 120. In some embodiments, the payment system(s) 144 may form part of the publication system(s) 142.

In some example embodiments, the customization system 150 provides functionality operable to optimize requested content based on the available battery power at the requesting client device. For example, the customization system 150 receives content item requests and accesses the indicated content items from the database(s) 126, the third party server(s) 130, the publication system(s) 142, and other sources. In some example embodiments, the customization system 150 analyzes the user data to perform personalization of user preferences. As more content is added to a user profile, the customization system 150 further refines the customization.

In some example embodiments, the customization system 150 receives a content item request from a client device 102. In response, the customization system 150 determines whether the content request includes current remaining battery power data for the client device 102. If so, the customization system 150 then determines if the current battery power is below the threshold level.

In some example embodiments, in accordance with a determination that the current remaining battery power data indicates remaining battery power below the threshold level, the customization system 150 analyzes the requested content item(s) to determine one or more core content items. Once the core content sections have been identified, the customization system 150 generates customized versions of the requested content items that included only the core content sections. The customized versions of the requested content item are then transmitted to the requesting client device 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and customization system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 128. The programmatic client 116 may, for example, be a seller application (e.g., the Turbo Lister application developed by eBay® Inc., of San Jose, California) to enable sellers to author and manage listings on the server system 120 in an off-line manner, and to perform batch-mode communications between the programmatic client 116 and the server system 120.

Additionally, a third party application(s) 132, executing on a third party server(s) 130, is shown as having programmatic access to the server system 120 via the programmatic interface provided by the API server 128. For example, the third party application 132, utilizing information retrieved from the server system 120, may support one or more features or functions on a website hosted by the third party. The third party website may, for example, provide one or more promotional, marketplace, or payment functions that are supported by the relevant applications of the server system 120.

Figure 2:
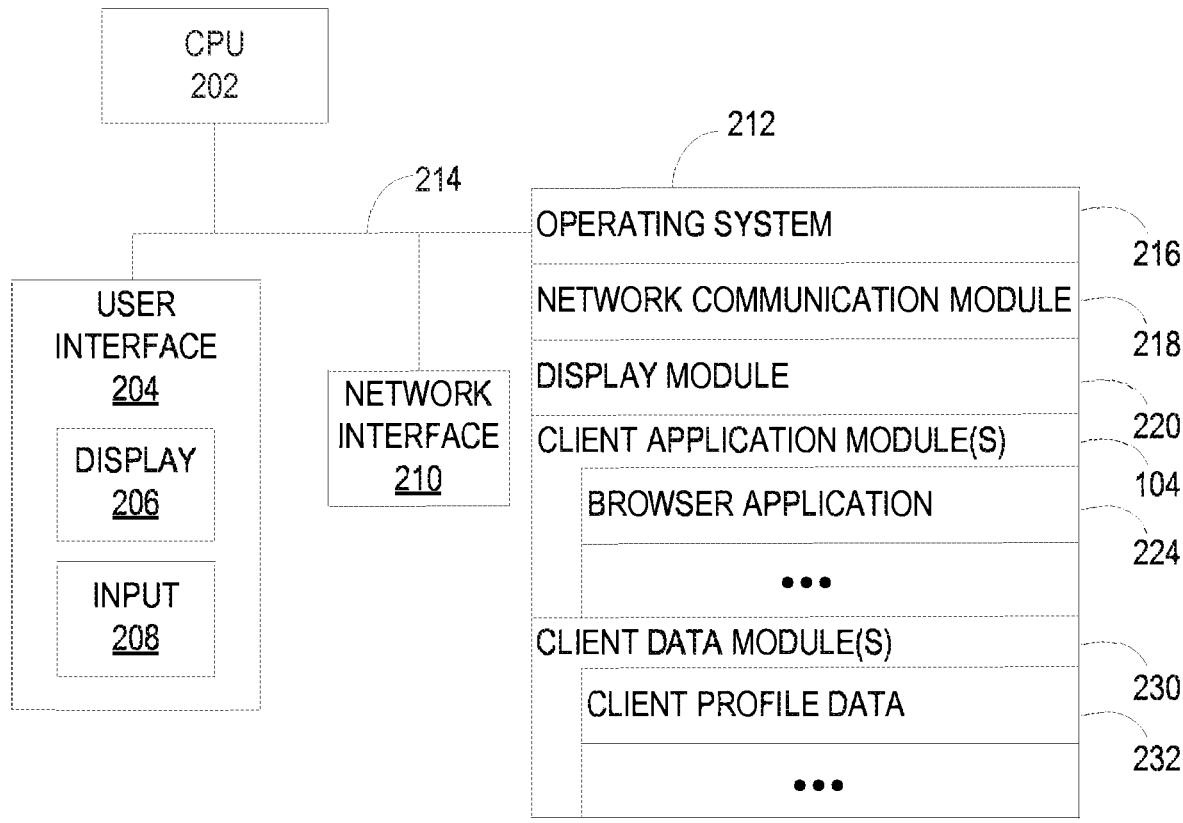
FIG. 2 is a block diagram further illustrating the client device of FIG. 1, in accordance with some example embodiments.

FIG. 2 is a block diagram further illustrating the client device 102, in accordance with some example embodiments. The client device 102 typically includes one or more central processing unit (CPU) 202, one or more network interface 210, memory 212, and one or more communication bus 214 for interconnecting these components. The client device 102 includes a user interface 204. The user interface 204 includes a display device 206 and optionally includes an input means such as a keyboard, mouse, a touch sensitive display, or other input buttons 208. Furthermore, some client devices 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer-readable storage medium.

In some example embodiments, memory 212, or the computer-readable storage medium of memory 212, stores the following programs, modules, and data structures, or a subset thereof:

- an operating system 216 that includes procedures for handling various basic system services and for performing hardware-dependent tasks;
- a network communication module 218 that is used for connecting the client device 102 to other computers via the one or more communication network interfaces 210 (wired or wireless) and one or more communication networks 104, such as the Internet, other WANs, LANs, metropolitan area networks (MANs), etc.;
- a display module 220 for enabling the information generated by the operating system 216 and client application(s) 114 to be presented visually on the display device 206;
- one or more client application module 104 for handling various aspects of interacting with the server system 120 (FIG. 1), including but not limited to:
  - a browser application 224 for requesting information from the server system 120 (e.g., content items and listings) and receiving responses from the server system 120; and
- client data module(s) 230 for storing data relevant to the clients, including but not limited to:
  - client profile data 232 for storing profile data related to a user (e.g., user 106) of the server system 120 associated with the client device 102.

Figure 3:
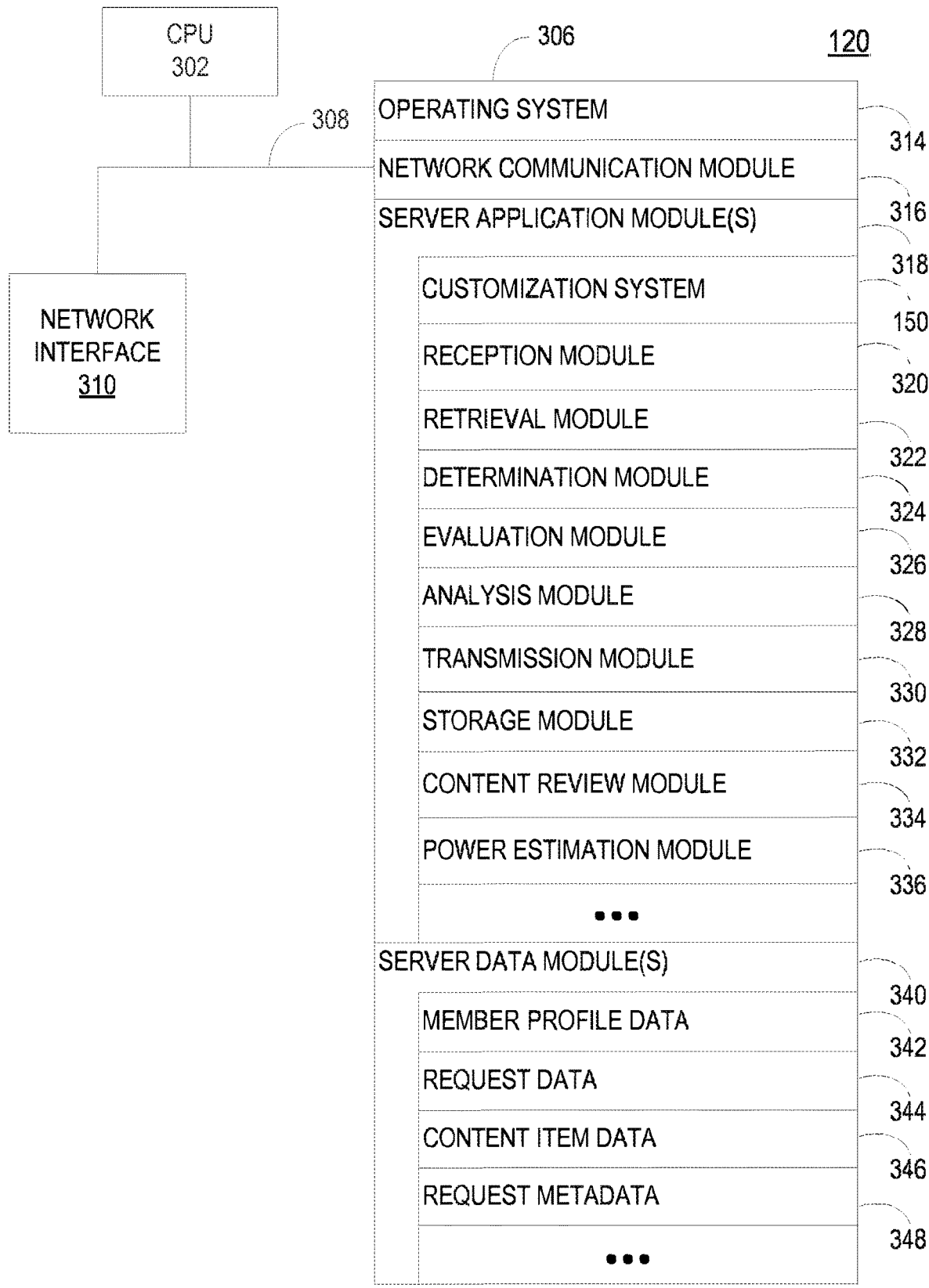
FIG. 3 is a block diagram further illustrating the server system of FIG. 1, in accordance with some example embodiments.

FIG. 3 is a block diagram further illustrating the server system 120, in accordance with some example embodiments. The server system 120 typically includes one or more CPU 302, one or more network interface 310, memory 306, and one or more communication bus 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer-readable storage medium. In some example embodiments, memory 306, or the computer-readable storage medium of memory 306, stores the following programs, modules, and data structures, or a subset thereof:

- an operating system 314 that includes procedures for handling various basic system services and for performing hardware-dependent tasks;
- a network communication module 316 that is used for connecting the server system 120 to other computers via the one or more communication network interface 310 (wired or wireless) and one or more communication network 104, such as the Internet, other WANs, LANs, MANs, and so on;

one or more server application module 318 for performing the services offered by the server system 120, including but not limited to:

a customization system 150 for altering content items based on the current remaining battery power of the requesting client device (e.g., client device 102 in FIG. 1);

a reception module 320 for receiving content item requests from a client device (e.g., client device 102 in FIG. 1);

a retrieval module 322 for retrieving content item data from a content item database based on the content item request;

a determination module 324 for determining whether the content item request includes current remaining battery power data for the requesting client device (e.g., client device 102 in FIG. 1);

an evaluation module 326 for determining whether the current remaining battery power data is below a predetermined threshold;

an analysis module 328 for analyzing one or more content items to identify one or more core content sections of the one or more content items;

a transmission module 330 for transmitting one or more core content sections of the one or more content items;

a storage module 332 for storing content item data in a database;

a content review module 334 for determining one or more core content sections automatically, based on content analysis rules; and power estimation module 336 for determining, based on received current remaining battery power data, the amount of power left at a client device (e.g., client device 102 in FIG. 1); and server data module(s) 340, holding data related to server system 120, including but not limited to:

member profile data 342 including both data provided by the member who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on member activity, social graph data, remaining power threshold value, and so on;

request data 344 for storing requests from one or more client devices (e.g., client device 102 in FIG. 1);

content item data 346 including data for one or more content items (e.g., videos, posts, images, blogs, and so on); and metadata 348 for storing metadata received with one or more content item request.

FIG. 4 depicts a block diagram of an exemplary data structure for a content item request, in accordance with some example embodiments. In some example embodiments, a content item request includes a client ID 402 value that identifies the specific client device (e.g., client device 102 in FIG. 1) that is the source of the request. In some example embodiments, the client ID 402 identifies the existing account of a user (e.g., user 106) on the server system (e.g., server system 120 in FIG. 1).

In some example embodiments, the content item request 400 includes a network address 404 (e.g., an IP address), which identifies the location to which the requested content item should be sent.

In some example embodiments, the content item request 400 includes battery power data 406 that describes the current remaining battery power data. In some example embodiments, the battery power data 406 is represented as a percentage of the maximum power of the battery. In other example embodiments, the battery power data 406 is represented as a time remaining (e.g., the amount of time the device can continue to function based on the current remaining battery power).

In some example embodiments, the content item request 400 includes a requested content identifier 408. The requested content identifier 408 identifies one or more content items in the database (e.g., database(s) 126) at the server system (e.g., server system 120 in FIG. 1). In some example embodiments, the content item request 400 includes the request timestamp 410 (e.g., the time that the request was received).

Figure 5:
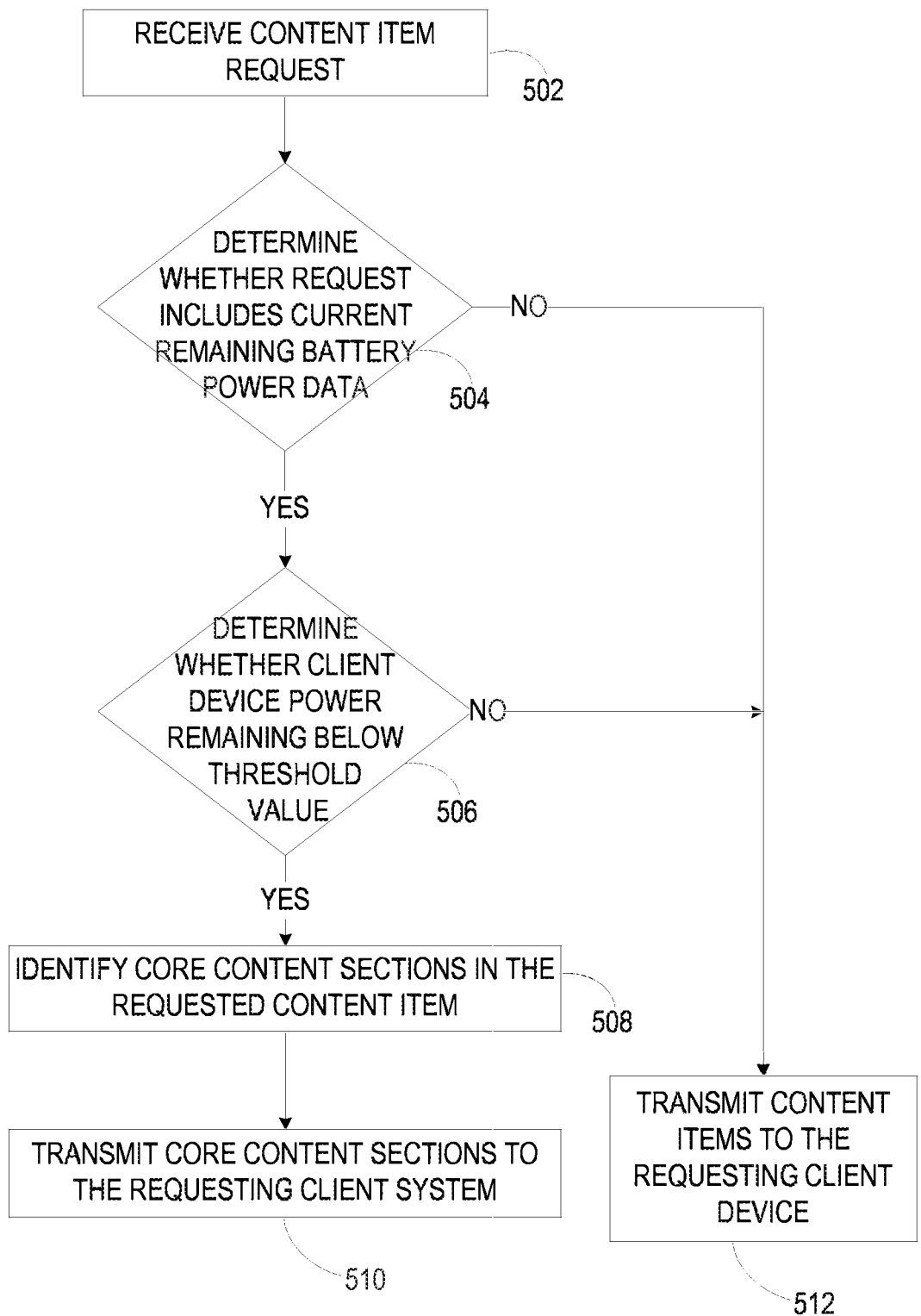
FIG. 5 is a flow diagram illustrating a method, in accordance with some example embodiments, for optimizing communications based on battery power of a client device.

FIG. 5 is a flow diagram illustrating a method, in accordance with some example embodiments, for optimizing communications based on battery power of a client device (e.g., client device 102 in FIG. 1). Each of the operations shown in FIG. 5 may correspond to instructions stored in a computer memory or machine-readable storage medium. In some embodiments, the method described in FIG. 5 is performed by a server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives (502) a content item request from a client device (e.g., client device 102 in FIG. 1). In some example embodiments, the content item request identifies one or more content items (e.g., text, image, video, interactive media, audio content, item listings, user profiles, comments, and so on) stored in a database (e.g., database(s) 126) at the server system (e.g., server system 120 in FIG. 1). In some example embodiments, the requested content items are stored at a third party system (e.g., third party server(s) 130 in FIG. 1).

In some example embodiments, the server system (e.g., server system 120 in FIG. 1) determines (504) whether the content item request includes current remaining battery power data for the client device (e.g., client device 102 in FIG. 1). In some example embodiments, the current remaining battery power data is included as metadata (e.g., as opposed to the main request data) with the content item request.

In some example embodiments, the server system (e.g., server system 120 in FIG. 1) determines (504) that the content item request does not include current remaining battery power data for the requesting client device (e.g., client device 102 in FIG. 1). In response, the server system (e.g., server system 120 in FIG. 1) transmits (512) the content items to the requesting client device (e.g., client device 102 in FIG. 1). Thus, no customization is applied to the requested content items before they are transmitted to the client device (e.g., client device 102 in FIG. 1).

In some example embodiments, the server system (e.g., server system 120 in FIG. 1) determines (504) that the content item request includes current remaining battery power data for the originating client device (e.g., client device 102 in FIG. 1).

In some example embodiments, the server system (e.g., server system 120 in FIG. 1) determines that the content item request does not include current remaining battery power data or that it includes explicit instructions from the client system (e.g., client system 102 in FIG. 1) that the requested content should not be altered based on current remaining battery power data. If no such data is sent with the content request (or if the request includes specific instructions not to customize the content based on the battery data) the content is then transmitted (512) to the user without modification.

In response, the server system (e.g., server system 120 in FIG. 1) determines (506) whether the current remaining battery power data associated with the client device (e.g., client device 102 in FIG. 1) indicates a level of remaining power that is below a predetermined threshold level. For example, if the current remaining battery power data indicates that the client device (e.g., client device 102 in FIG. 1) has 10% of its power left, the server system (e.g., server system 120 in FIG. 1) determines that the client device (e.g., client device 102 in FIG. 1) is below the threshold value. In some example embodiments, each user can determine their own threshold value. In some example embodiments, threshold values can be based on specific client devices (e.g., client device 102 in FIG. 1) (where a user has more than one device and would like different threshold values for each).

In some example embodiments, the server system (e.g., server system 120 in FIG. 1) determines that the client device (e.g., client device 102 in FIG. 1) power is not below the threshold value. In response, the server system (e.g., server system 120 in FIG. 1) transmits (512) the requested content items (unaltered) to the client device (e.g., client device 102 in FIG. 1).

In some example embodiments, the server system (e.g., server system 120 in FIG. 1) determines (506) that the estimated power remaining at the client device (e.g., client device 102 in FIG. 1) is below the predetermined threshold value, and the server system (e.g., server system 120 in FIG. 1) identifies (508) core content sections in the requested content item(s). For example, a core content section for a blog post might be the plain text (without any images, special formatting, or comments) of the blog post. In another example, the core content section of an image is the lowest available resolution version of that image.

In some example embodiments, the server system (e.g., server system 120 in FIG. 1) transmits (510) the core content sections to the requesting client device (e.g., client device 102 in FIG. 1).

Figure 6:
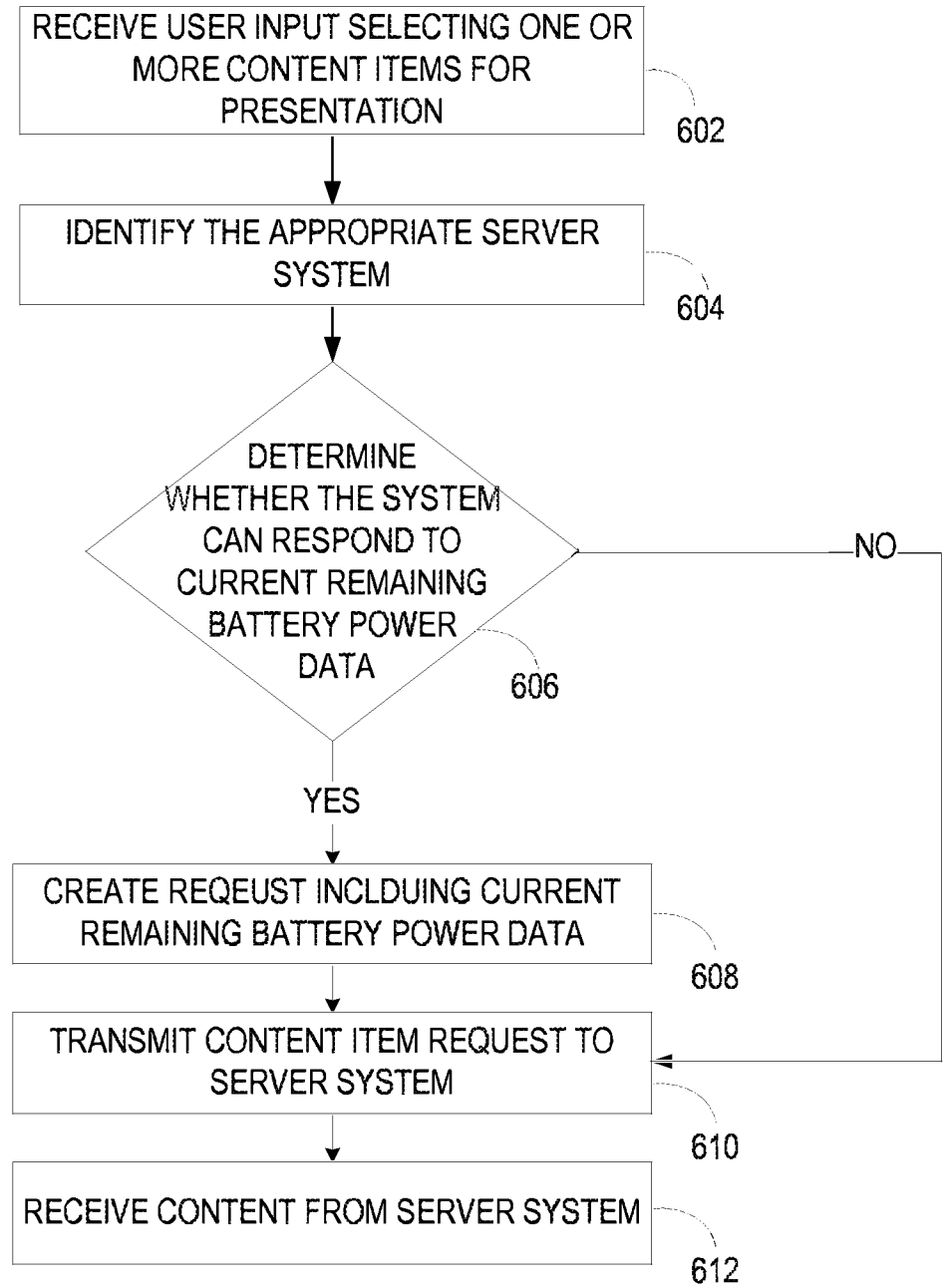
FIG. 6 is a flow diagram illustrating a method, in accordance with some example embodiments, for requesting content items from a server system while including current remaining battery power data to customize service.

FIG. 6 is a flow diagram illustrating a method, in accordance with some example embodiments, for requesting content items from a server system while including current remaining battery power data to customize service. Each of the operations shown in FIG. 6 may correspond to instructions stored in a computer memory or computer-readable storage medium. In some embodiments, the method described in FIG. 6 is performed by the client device (e.g., client device 102 in FIG. 1). However, the method described can also be performed by any other suitable configuration of electronic hardware.

In some embodiments the method is performed at a client device (e.g., client device 102 in FIG. 1) including one or more processors and memory storing one or more programs for execution by the one or more processors.

In some example embodiments, the client device (e.g., client device 102 in FIG. 1) receives (602) user input selecting one or more content items for presentation at the client device. For example, the user clicks on a hyperlink or button that causes a new webpage to be requested. The client device identifies (604) the server system (e.g., server system 120 in FIG. 1) that hosts (e.g., stores) the requested one or more content items. For example, the IP address associated with a uniform resource locator (URL).

In some example embodiments, the client device (e.g., client device 102 in FIG. 1) determines (606) whether the identified server system (e.g., server system 120 in FIG. 1) is able to customize received content based on the current remaining battery power of the client device (e.g., client device 102 in FIG. 1). In some example embodiments, the client device (e.g., client device 102 in FIG. 1) stores a list of server systems (e.g., server system 120 in FIG. 1) that have enabled this feature. In other example embodiments, the client device sends a query to the server system to determine its capabilities. In some example embodiments, this is determined during the initial handshake (SYN-ACK process).

In accordance with a determination (606) that the identified server system (e.g., server system 120 in FIG. 1) does not have the capability to respond correctly to current remaining battery power data, the client device (e.g., client device 102 in FIG. 1) merely transmits (610) the content item request to the server system (e.g., server system 120 in FIG. 1) without any current remaining battery power data.

In some example embodiments, in accordance with a determination (606) that the server system (e.g., server system 120 in FIG. 1) has enabled the capacity to respond correctly to current remaining battery power data, the client device (e.g., client device 102 in FIG. 1) creates (608) a request that includes current remaining battery power data. In some example embodiments, the request also includes user preferences on the current remaining battery power threshold. For example, the client device (e.g., client device 102 in FIG. 1) indicates that the server system (e.g., server system 120 in FIG. 1) should not begin to customize content until the current remaining battery power drops below 1 hour of time remaining.

In some example embodiments, the client device (e.g., client device 102 in FIG. 1) determines whether it falls below the current remaining battery power threshold prior to sending the content item request. If so, the current remaining battery power data is a Boolean value indicating that the client device (e.g., client device 102 in FIG. 1) is either below the threshold or not.

In some example embodiments, the client device (e.g., client device 102 in FIG. 1) receives (612) content from the server system (e.g., server system 120 in FIG. 1). In some example embodiments, the received content are the entire requested content items (e.g., without any modifications based on client device (e.g., client device 102 in FIG. 1) power). In some example embodiments, the content includes one or more core content sections, wherein the core content sections are sent in response to a determination that the client device (e.g., client device 102 in FIG. 1) has remaining power below the lower threshold.

In some example embodiments, the received content is presented to the user (e.g., user 106). In some example embodiments, if core content sections are received, the client device (e.g., client device 102 in FIG. 1) displays a notification to the user explaining that the requested content has been cut down to preserve power and giving the user an opportunity to request the full versions. If the user does so, a new content item request is sent that includes explicit instructions to send the entire content item without any alterations. In other example embodiments, the client system (e.g., client system 102 in FIG. 1) can simply send the content item request without any current remaining battery power data and the server system (e.g., server system 120 in FIG. 1) will not alter the content item in any way.

Figure 7:
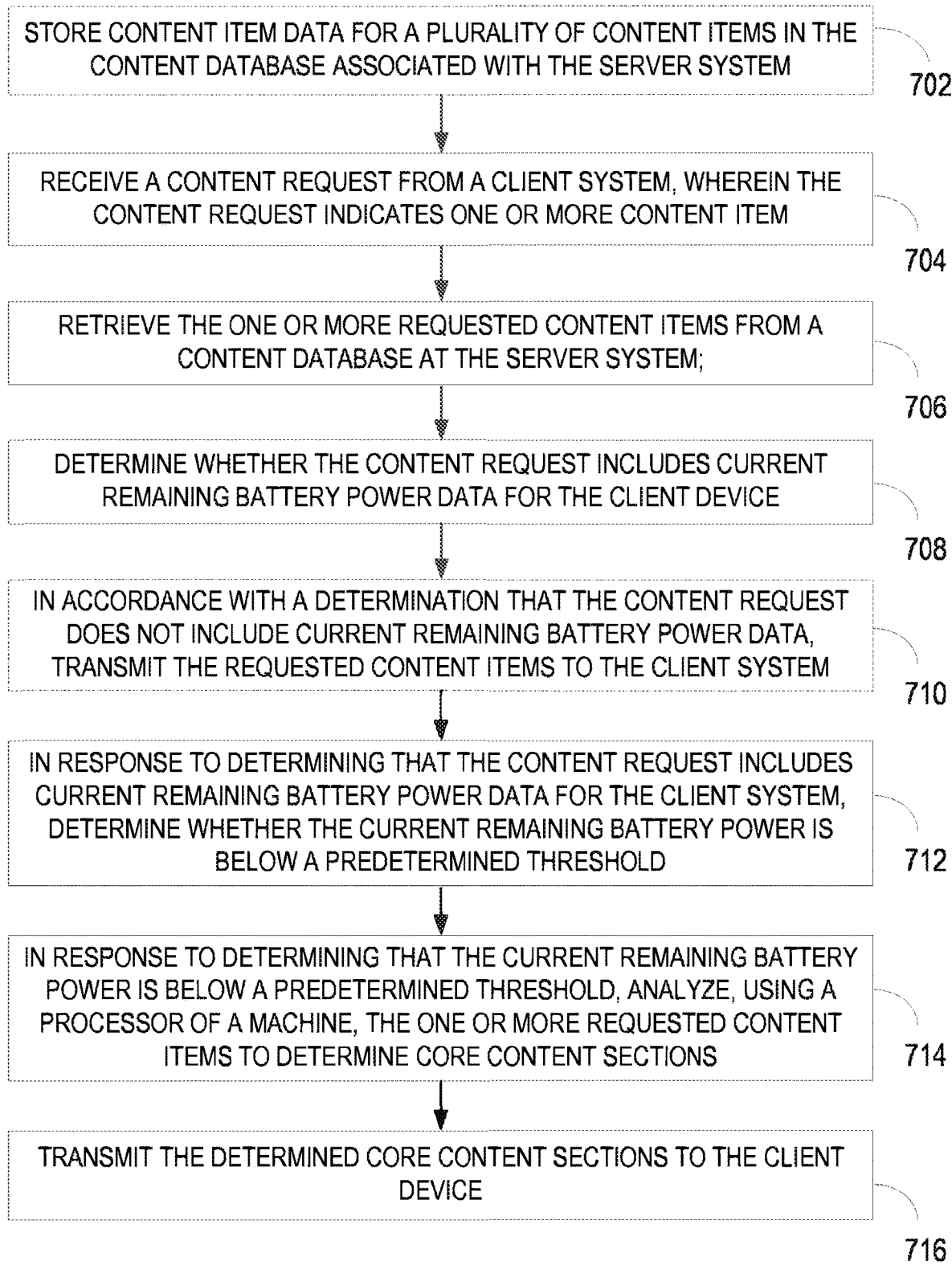
FIG. 7 is a flow diagram illustrating a method, in accordance with some example embodiments, for optimizing communications based on battery power of a client device.

FIG. 7 is a flow diagram illustrating a method, in accordance with some example embodiments, for optimizing communications based on battery power of a client device (e.g., client device 102 in FIG. 1). Each of the operations shown in FIG. 7 may correspond to instructions stored in a computer memory or computer-readable storage medium. Optional operations are indicated by dashed lines (e.g., boxes with dashed-line borders). In some embodiments, the method described in FIG. 7 is performed by a server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) stores (702) content item data for a plurality of content items in the content database associated with the server system. In some example embodiments, the content items are received from users of the server system. A user who creates a content item can be known as the creator of the content item.

In some example embodiments, the server system (e.g., server system 120 in FIG. 1) receives (704) a content request from a client device, wherein the content request indicates one or more content items. For example, the content request can be a GET request for a specific webpage. In this case, the specific webpage indicated would be the one or more content items indicated by the request.

In some example embodiments, the server system (e.g., server system 120 in FIG. 1) retrieves (706) or otherwise accesses the one or more requested content items from a content database at the server system (e.g., server system 120 in FIG. 1). In some example embodiments, the content items are actually stored at a third party system, remote from both the server system (e.g., server system 120 in FIG. 1) and the client device (e.g., client device 102 in FIG. 1). In this case, the server system sends a request to the third party system. Once the requested content items have been received from the third party system, the server system stores the content item (at least temporarily) for analysis.

In some example embodiments, the server system (e.g., server system 120 in FIG. 1) determines (708) whether the content request includes current remaining battery power data for the client device (e.g., client device 102 in FIG. 1). In some example embodiments, the current remaining battery power data is metadata with the content item request. For example, the GET request includes a header. That header includes various metadata about the request, including, for example, the IP address of the sender and, in some cases, the current remaining battery power data of the client device. If no such data is sent with the content request (or if the request includes specific instructions not to customize the content based on the battery data) the content is then sent to the user without modification.

In some example embodiments, the client device (e.g., client device 102 in FIG. 1) first sends a request to the server system (e.g., server system 120 in FIG. 1) to determine whether the server system is capable of handling current remaining battery power data correctly. If the server system is running software able to check for, and respond correctly to, current remaining battery power data, the server system responds indicating that the server system is able to process current remaining battery power data.

In some example embodiments, in accordance with a determination that the content request does not include current remaining battery power data, the requested content items are transmitted (710) to the client device (e.g., client device 102 in FIG. 1). For example, the server system (e.g., server system 120 in FIG. 1) scans the data included in the content item request. If no current remaining battery power data is found, the server system (e.g., server system 120 in FIG. 1) cannot estimate the client device's (e.g., client device 102 in FIG. 1) current battery power and thus sends the full requested content items.

In some example embodiments, in response to determining that the content request includes current remaining battery power data for the client device (e.g., client device 102 in FIG. 1), the server system (e.g., server system 120 in FIG. 1) determines (712) whether the current remaining battery power is below a predetermined threshold. For example, the current remaining battery power data included in the content item request indicates that the client device (e.g., client device 102 in FIG. 1) has three percent of total battery life left. The server system (e.g., server system 120 in FIG. 1) compares that amount to the predetermined threshold of five percent and determines that the client device is below the predetermined threshold.

In some example embodiments, the current remaining battery power data describes a percentage of total battery power. For example, the current remaining battery power data for a client device (e.g., client device 102 in FIG. 1) is 50%. In some example embodiments, the current remaining battery power data describes a total time of operation left based on current energy consumption levels. In this case, the current remaining battery power data is listed as an amount of time such as 5 minutes or 2.5 hours.

In some example embodiments, the current remaining battery power data is a simple binary or Boolean value indicating the client device's (e.g., client device 102 in FIG. 1) own determination that the current remaining battery power has dropped below a predetermined threshold. Thus, the current remaining battery power data would list PowerBelowThreshold=True or PowerBelowThreshold=False.

In some example embodiments, the current remaining battery power data includes a measure of the charge of the power left in the battery (e.g., using ampere-hours) and the server system (e.g., server system 120 in FIG. 1) uses that information to calculate a percentage or a time. In some example embodiments, the client device (e.g., client device 102 in FIG. 1) transmits the total power capacity of the battery and/or the rate at which power is being used (or is expected to be used) to the server system for the server system to use in calculating whether the client device is below the threshold value.

In some example embodiments, the predetermined threshold value is set based on the preferences of the client device (e.g., client device 102 in FIG. 1) making the request. Thus, the predetermined threshold value is set based on data received from the client device. For example, client A is using their device a home, where a charger is easily accessible and thus has a very low threshold value (e.g., 1%). Another client, client B, is using a mobile device on public transportation and, not wanting to run out of battery life, sets a relatively high threshold value (e.g., 25%). Indeed, a user with more than one client device (e.g., client device 102 in FIG. 1) can set up different profiles for each different device.

In some example embodiments, in response to determining that the current remaining battery power is below a predetermined threshold, the server system (e.g., server system 120 in FIG. 1) analyzes (714), using a processor of a machine, the one or more requested content items to determine core content sections.

In some example embodiments, the core content sections are designated by the creator of the content item. Thus, when the content item is saved in the content data database it includes one or more designated "core content sections." Core content sections include the content considered the most important to the content item. Thus, for example, if the content item is a music video, the sound track (e.g., the music) would be considered the core content. In other example embodiments, a lower bitrate version of the song may be considered core content.

In some example embodiments, the core content sections are automatically identified based on content identification rules. In some example embodiments, content identification rules distinguish advertisements from core content such that advertisements may be excluded based on battery level. In other example embodiments, lower resolution videos and images are core content and may be transmitted if the current remaining battery power for a client device is too low.

In some example embodiments, there are multiple levels of importance for sections of a content item. In this case, the server system (e.g., server system 120 in FIG. 1) can select from a plurality of levels of importance when selecting core content sections. In some example embodiments, if the current remaining battery power for a client device (e.g., client device 102 in FIG. 1) is very low, only the most important sections are sent. However, if the battery power is low but not critically low, medium level content may still be transmitted.

In some example embodiments, the content item request includes data describing which of a plurality of power levels of the client device (e.g., client device 102 in FIG. 1) is current, and only those content sections with that level of importance are actually transmitted.

In some example embodiments, the server system (e.g., server system 120 in FIG. 1) then transmits (716) the determined core content sections to the client device (e.g., client device 102 in FIG. 1). In some example embodiments, the transmitted content item or core content sections are then presented at the client device (e.g., client device 102 in FIG. 1).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 5-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 8:
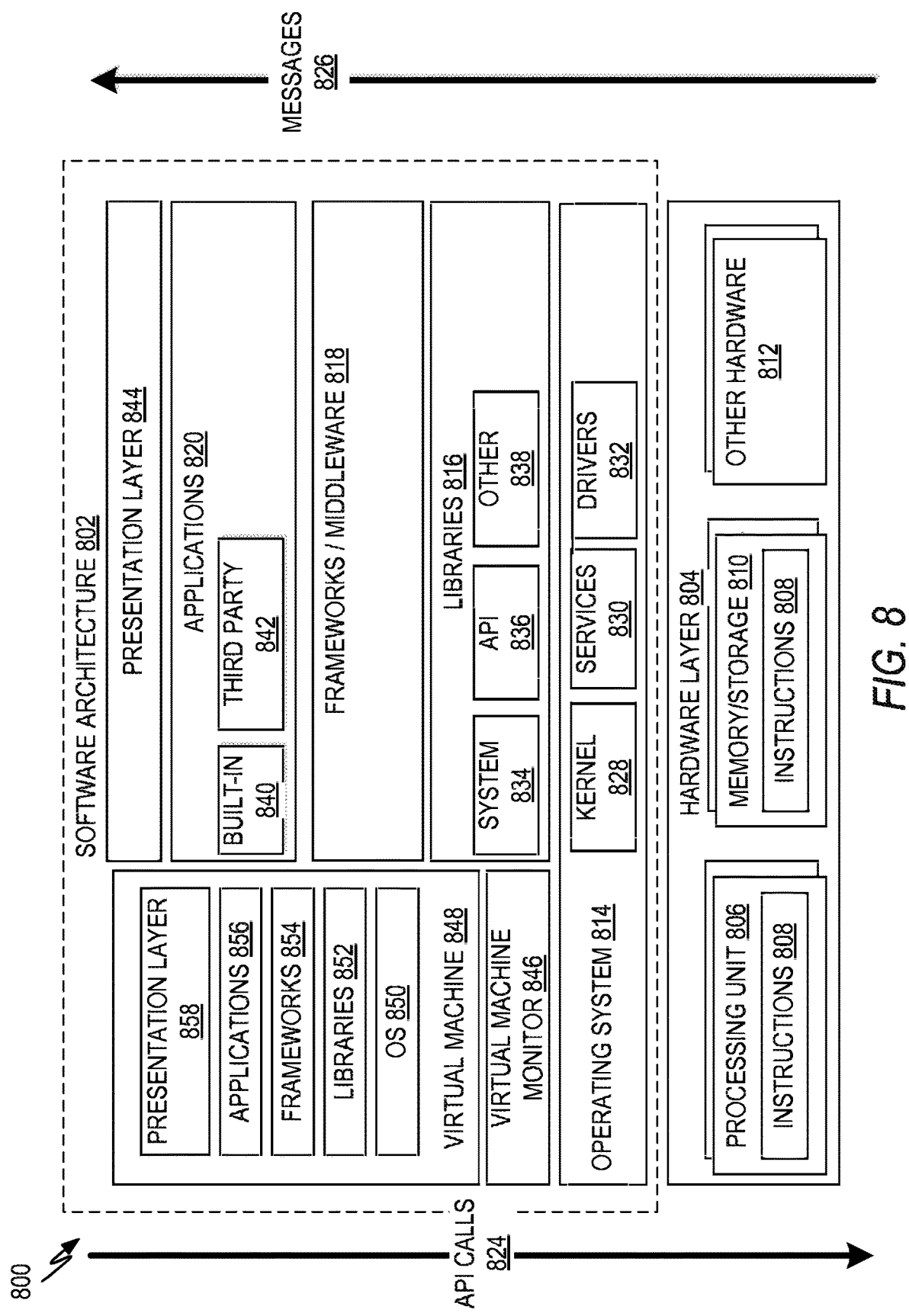
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802, including implementation of the methods, modules and so forth of FIGS. 5-7. Hardware layer 804 also includes memory and/or storage modules 810, which also have executable instructions 808. Hardware layer 804 may also comprise other hardware 812, which represents any other hardware of the hardware layer 804, such as the other hardware illustrated as part of machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system libraries 834, API libraries 836, and other libraries 838), frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the machine of FIG. 9, for example). A virtual machine is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks 854, applications 856 and/or presentation layer 858. These layers of software architecture executing within the virtual machine 848 can be the same as corresponding layers previously described or may be different.

Example Machine Architecture and Machine-Readable Medium

Figure 9:
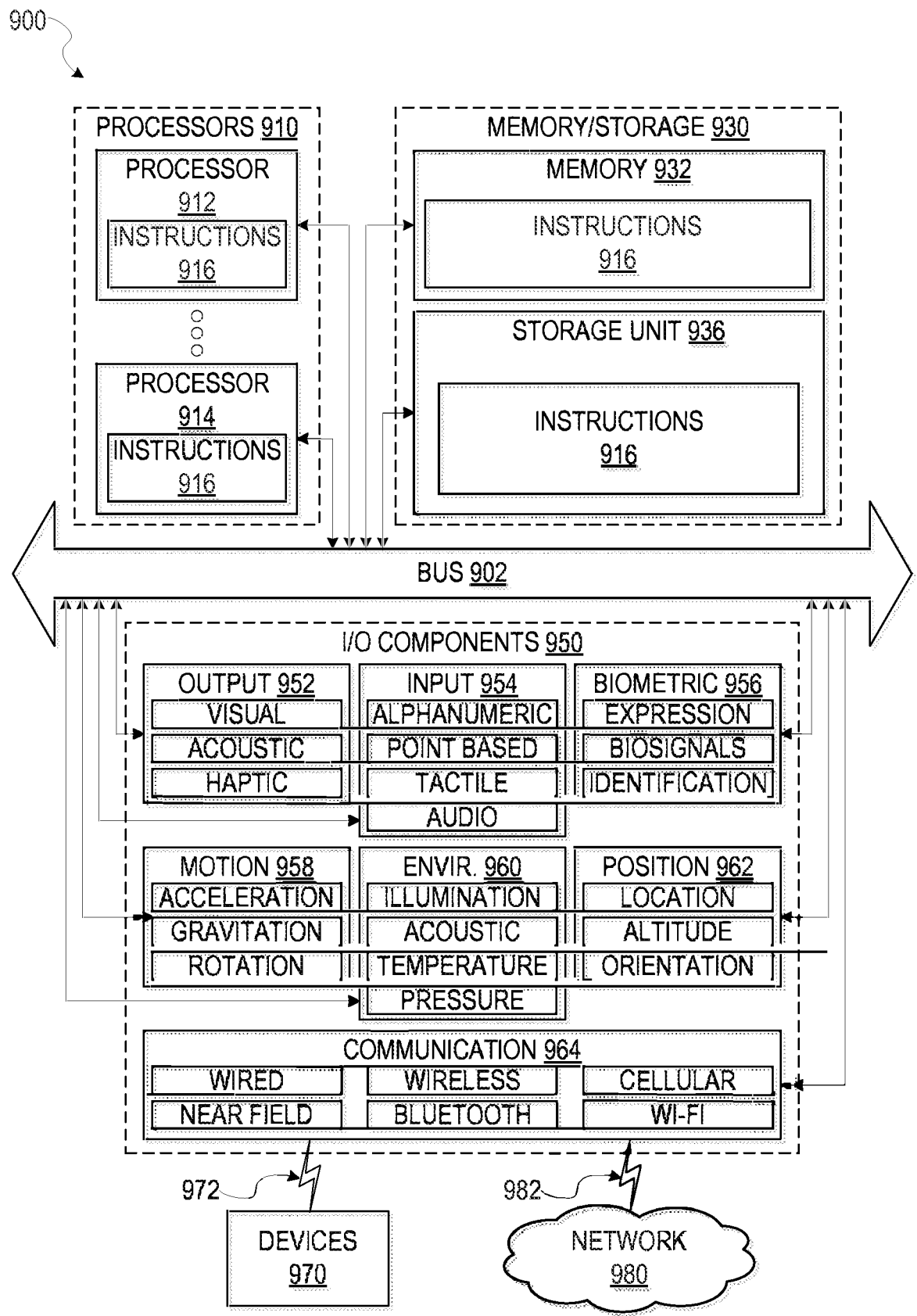
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the flow diagrams of FIGS. 5-7. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE)

technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more processors of a machine; and
   a computer-readable storage medium storing instructions that, when executed by the one or more processors, cause the machine to perform operations comprising:
   receiving a content request for a content item from a client device, the content request created responsive to a user selection of the content item, the content request indicating a current remaining battery power of the client device; and
   automatically transmitting, to the client device, a response to the content request with a lower resolution version of the content item based on the current remaining battery power, the lower resolution version of the content item identified as a core content section of the content item based on analysis of the content item using one or more content analysis rules, and the current remaining battery power indicating to transmit core content sections.

2. The system of claim 1, wherein the operations further comprise generating the lower resolution version of the content item.

3. The system of claim 1, wherein including the lower resolution version of the content item in the response is further based on user preferences for the client device.

4. The system of claim 1, wherein the operations further comprise selecting the lower resolution version of the content item from a plurality of available lower resolution versions of the content item based on the current remaining battery power, the plurality of available lower resolution versions having different levels of resolution that are lower than a full resolution version of the content item.

5. The system of claim 1, wherein the current remaining battery power is indicated in the content request by at least one of:
   a Boolean value indicating whether the current remaining battery power has dropped below a predetermined threshold;
   a percentage of total battery power of the client device;
   a measure of charge in a battery of the client device;
   a rate at which power is being used on the client device and a total power capacity of the battery of the client device; and
   an amount of time left for operation of the client device.

6. The system of claim 1, wherein including the lower resolution version of the content item in the response is further based on whether the current remaining battery power is below a predetermined threshold.

7. The system of claim 1, further comprising determining that the lower resolution version of the content item is a core content section of the content item based on the one or more content analysis rules.

8. The system of claim 1, wherein the one or more content analysis rules distinguish advertisements from core content sections.

9. A computer-implemented method comprising:
- receiving a content request for a content item from a client device, the content request created responsive to a user selection of the content item, the content request indicating a current remaining battery power of the client device; and
- automatically transmitting, to the client device, a response to the content request with a lower bitrate version of the content item based on the current remaining battery power, the lower bitrate version of the content item identified as a core content section of the content item based on analysis of the content item using one or more content analysis rules, and the current remaining battery power indicating to transmit core content sections.

10. The computer-implemented method of claim 9, further comprising generating the lower bitrate version of the content item.

11. The computer-implemented method of claim 9, wherein including the lower bitrate version of the content item in the response is further based on user preferences for the client device.

12. The computer-implemented method of claim 9, further comprising selecting the lower bitrate version of the content item from a plurality of available lower bitrate versions of the content item based on the current remaining battery power, the plurality of available lower bitrate versions having different bitrates that are lower than a full bitrate version of the content item.

13. The computer-implemented method of claim 9, wherein the current remaining battery power is indicated in the content request by at least one of:
- a Boolean value indicating whether the current remaining battery power has dropped below a predetermined threshold;
- a percentage of total battery power of the client device;
- a measure of charge in a battery of the client device;
- a rate at which power is being used on the client device and a total power capacity of the battery of the client device; and
- an amount of time left for operation of the client device.

14. The computer-implemented method of claim 9, wherein including the lower bitrate version of the content item in the response is further based on whether the current remaining battery power of the client device is below a predetermined threshold.

15. The computer-implemented method of claim 9, wherein including the lower bitrate version of the content item in the response is further based on data received with the content request.

16. A computer-implemented method comprising:
- receiving a content request for a content item from a client device, the content request created responsive to a user selection of the content item, the content request indicating a current remaining battery power of the client device; and
- automatically transmitting, to the client device, a response to the content request with a lower frame rate version of the content item based on the current remaining battery power, the lower frame rate version of the content item identified as a core content section of the content item based on analysis of the content item using one or more content analysis rules, and the current remaining battery power indicating to transmit core content sections.

17. The computer-implemented method of claim 16, wherein including the lower frame rate version of the content item in the response is further based on user preferences for the client device.

18. The computer-implemented method of claim 16, further comprising selecting the lower frame rate version of the content item from a plurality of available lower frame rate versions of the content item based on the current remaining battery power, the plurality of available lower frame rate versions having different frame rates that are lower than a full frame rate version of the content item.

19. The computer-implemented method of claim 16, wherein the current remaining battery power is indicated in the content request by at least one of:
- a Boolean value indicating whether the current remaining battery power has dropped below a predetermined threshold;
- a percentage of total battery power of the client device;
- a measure of charge in a battery of the client device;
- a rate at which power is being used on the client device and a total power capacity of the battery of the client device; and
- an amount of time left for operation of the client device.

20. The computer-implemented method of claim 16, wherein including the lower frame rate version of the content item in the response is further based on data received with the content request.

* * * * *